United States Patent [19]

Ballheimer

[11] Patent Number: 4,638,769

[45] Date of Patent: Jan. 27, 1987

[54] ENGINE HAVING A MULTIPIECE CYLINDER BLOCK

[75] Inventor: Benny Ballheimer, Peoria, Ill.

[73] Assignee: Caterpillar Inc., Peoria, Ill.

[21] Appl. No.: 712,501

[22] Filed: Mar. 18, 1985

[51] Int. Cl.$^4$ .............................................. F02F 1/16
[52] U.S. Cl. ............................. 123/41.84; 123/193 C
[58] Field of Search ............... 123/41.83, 41.84, 41.74, 123/193 C, 193 CH, 193 CP

[56] References Cited

U.S. PATENT DOCUMENTS

| | | | |
|---|---|---|---|
| 1,226,820 | 5/1917 | Shultz | 123/195 R |
| 2,851,020 | 9/1958 | Dolza | 123/41.69 |
| 2,985,156 | 5/1961 | Scheiterlein | 123/41.83 |
| 3,418,993 | 12/1966 | List . | |
| 3,653,369 | 4/1972 | Fangman et al. | 123/41.84 |
| 4,294,203 | 10/1981 | Jones | 123/195 R |
| 4,305,348 | 12/1981 | Martin | 123/41.82 R |
| 4,369,627 | 1/1983 | Kasting et al. | 60/605 |
| 4,399,783 | 8/1983 | Hauser, Jr. | 123/193 CH |
| 4,474,144 | 10/1984 | Tanaka et al. | 123/195 A |
| 4,523,555 | 6/1985 | Mezger et al. | 123/41.84 |
| 4,554,893 | 11/1985 | Vecellio | 123/41.83 |

FOREIGN PATENT DOCUMENTS

| | | |
|---|---|---|
| 214713 | 4/1961 | Austria ............................ 123/41.84 |
| 1908411 | 9/1970 | Fed. Rep. of Germany . |
| 2030983 | 1/1971 | Fed. Rep. of Germany . |
| 2441728 | 6/1980 | France . |
| 522730 | 6/1940 | United Kingdom . |
| 1027810 | 4/1966 | United Kingdom . |
| 2034419 | 6/1980 | United Kingdom . |
| 2058912 | 4/1981 | United Kingdom . |

*Primary Examiner*—William A. Cuchlinski, Jr.
*Attorney, Agent, or Firm*—Larry G. Cain

[57] ABSTRACT

The design and construction of present midsupported liner and multipiece block engines has caused increased manufacturing cost and reduced engine reliability. The present invention overcomes these engine construction problems by using an engine structure comprises the bottom block portion, cylinder head, top block portion positioned between the bottom block portion and the cylinder head and midsupported cylinder liner. The cylinder liner and the top block portion form an annular space therebetween for cooling the combustion area. The top block portion is structurally designed to have a simple profile which is easy to cast, core and machine thereby reducing overall costs. The predetermined height of the top block portion "$H_1$" and the predetermined height of the annular space "$H_2$" combined with the ability to vary both or either further simplifies the manufacturing of a variety of engines having a variety of output horsepower and yet retain a high efficiency level. The top block portion concept eliminates bottom bores and reduces high stresses in the components within the engine thereby increasing life and reducing down time.

19 Claims, 3 Drawing Figures

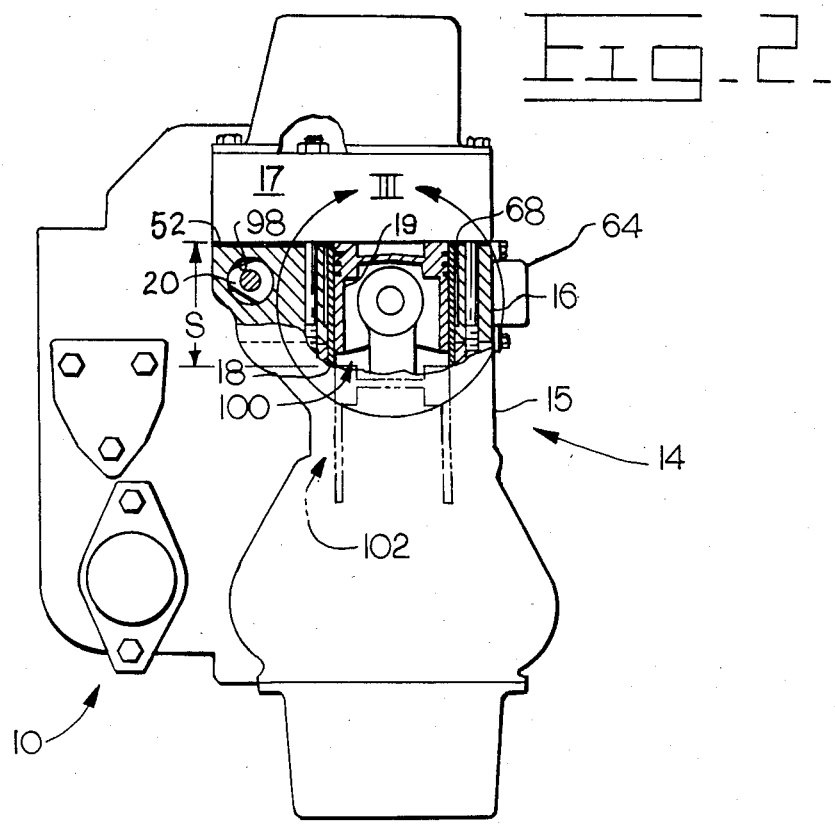
Fig_2.
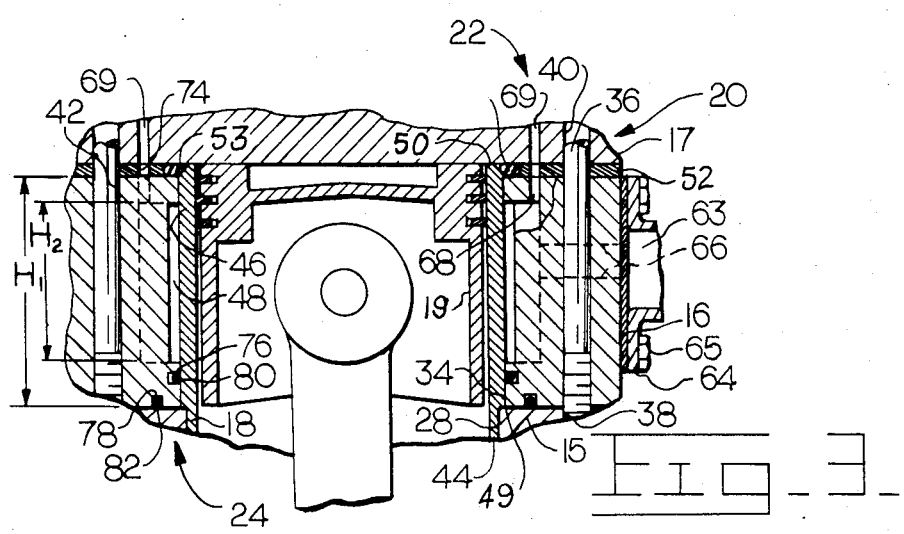
Fig_3.

ENGINE HAVING A MULTIPIECE CYLINDER BLOCK

DESCRIPTION

TECHNICAL FIELD

This invention relates generally to engines and more particularly to the construction of an engine having a multipiece block, a cylinder head, a midsupported cylinder liner and the structure used to assemble the components into an engine.

BACKGROUND ART

Engines are designed to perform various functions such as power plants for vehicles and generator sets and in a variety of output horsepowers. Bore size, length of stroke and compression ratios are varied to produce different horsepower ratings.

Many of today's engines typically use a watercooled block made from one casting with a replaceable cylinder liner or integral bore within the block. U.S. Pat. No. 4,369,627 issued to Edward W. Kasting et al on Jan. 25, 1983 discloses an example of one such engine.

U.S. Pat. No. 1,226,820 issued to A. B. Shultz on May 22, 1917 discloses an engine in which the body comprises an upper base section, a lower base section and a cylinder section which are detachably connected with each other. The cylinder sections of this design has a water space which surrounds substantially the entire length of the cylinder from top to bottom. The Shultz patent requires a precisely aligned core to form the water space, an elaborate cleaning technique and a substantially full length cooling system from top to bottom of the cooled block portion requiring a large cooling system. The assembly technique used to secure the individual cylinders to the upper section is difficult to service and maintain because access to the fastening screws are located within the upper base section.

Some engine designs appear to be moving away from the full length water cooled block or cylinder liner in an attempt to increase efficiency, reduce cost and improve the emissions. For example, U.S. Pat. No. 4,294,203 issued to Philip E. Jones on Oct. 13, 1981 discloses an engine having an integral head and upper cylinder assembly for use with an integral crankcase and lower cylinder section assembly. The upper and lower assemblies are formed to receive a wet cylinder liner which is directly contacted by the engine coolant over only a portion of the exterior surface of the liner which is received within the upper assembly. Although eliminating the need for a large cooling system, the machining costs and complexity of operations have drastically increased overall cost. The casting process although simplified from Shultz's design still requires a complex core and cleaning process. A deep blind bore is required within the one piece integral head and upper cylinder section assembly to allow for inserting the cylinder liner therein. It has been found from past experience that the bottom portion of such deep bores cause stress concentrators resulting in cracks and failure of similar components such as cylinder liners and blocks.

The same type of area which forms stress concentrators can be seen in U.S. Pat. No. 4,305,348 to Martin issued Dec. 15, 1981 where the shoulder surface intersects the outer diameter of the cylinder liner. The addition of heat from the combustion chamber further compounds the stresses due to a lack of cooling available around or near the flange at the top of the liner.

The present invention is directed to overcoming one or more of the problems as set forth above.

DISCLOSURE OF THE INVENTION

In one aspect of the invention, an engine includes a multipiece block and a cylinder head. The multipiece block has a bottom block portion with a bore therein. A top block portion has a through bore substantially coaxial with the bore in the bottom block portion and is positioned between the bottom block portion and the cylinder head. A means is provided for attaching the cylinder head to the bottom block portion. A midsupported cylinder liner has an upper portion positioned within the bore of the top block portion and a lower portion extending into the bore of the bottom block portion. An annular support surface is provided on the liner between the upper portion and the lower portion and seats on the bottom block portion. The midsupported cylinder liner is fixedly biased between the cylinder head and the bottom block portion.

In another aspect of the invention, an engine includes a multipiece block which has a bottom block portion with a bore therein, and a liquid cooling system which has a liquid cooling transfer pump and a heat exchanger. A cylinder head having a plurality of liquid cooling passages is connected in a liquid flow relationship with the transfer pump and the heat exchanger. A means is provided for attaching the cylinder head to the bottom block portion. A top block portion is positioned between the bottom block portion and the cylinder head and has a bore substantially coaxial with the bore in the bottom block portion. A midsupported cylinder liner has an upper portion positioned within the bore of the top block portion and a lower portion extending into the bore of the bottom block portion. An annular support surface is provided on the liner between the upper portion and the lower portion and seats on the lower block portion. The upper portion cooperates with the bore of the top block portion forming an annular space therebetween. A means is provided for communicating the liquid flow between the annular space and a plurality of cooling passages in the cylinder head. A means is provided for sealing the liquid flow through the annular space.

The present invention provides a multipiece engine block which controls the combustion temperature within the combustion chamber, reduces the complexity of the machining operations, casting complexity, size of cooling system requirements and increases engine life by reducing high stress areas within the engine.

BRIEF DESCRIPTION OF THE DRAWINGS

FIG. 2 is an end view of the engine with sections broken away to show the relationship of a cylinder head, top block portion, bottom block portion, midsupported cylinder liner and a piston and ring assembly of one of the cylinders; and FIG. 3 is an enlarged broken out section view of the area circumscribed within line III of FIG. 2.

BEST MODE FOR CARRYING OUT THE INVENTION

Figure 1:
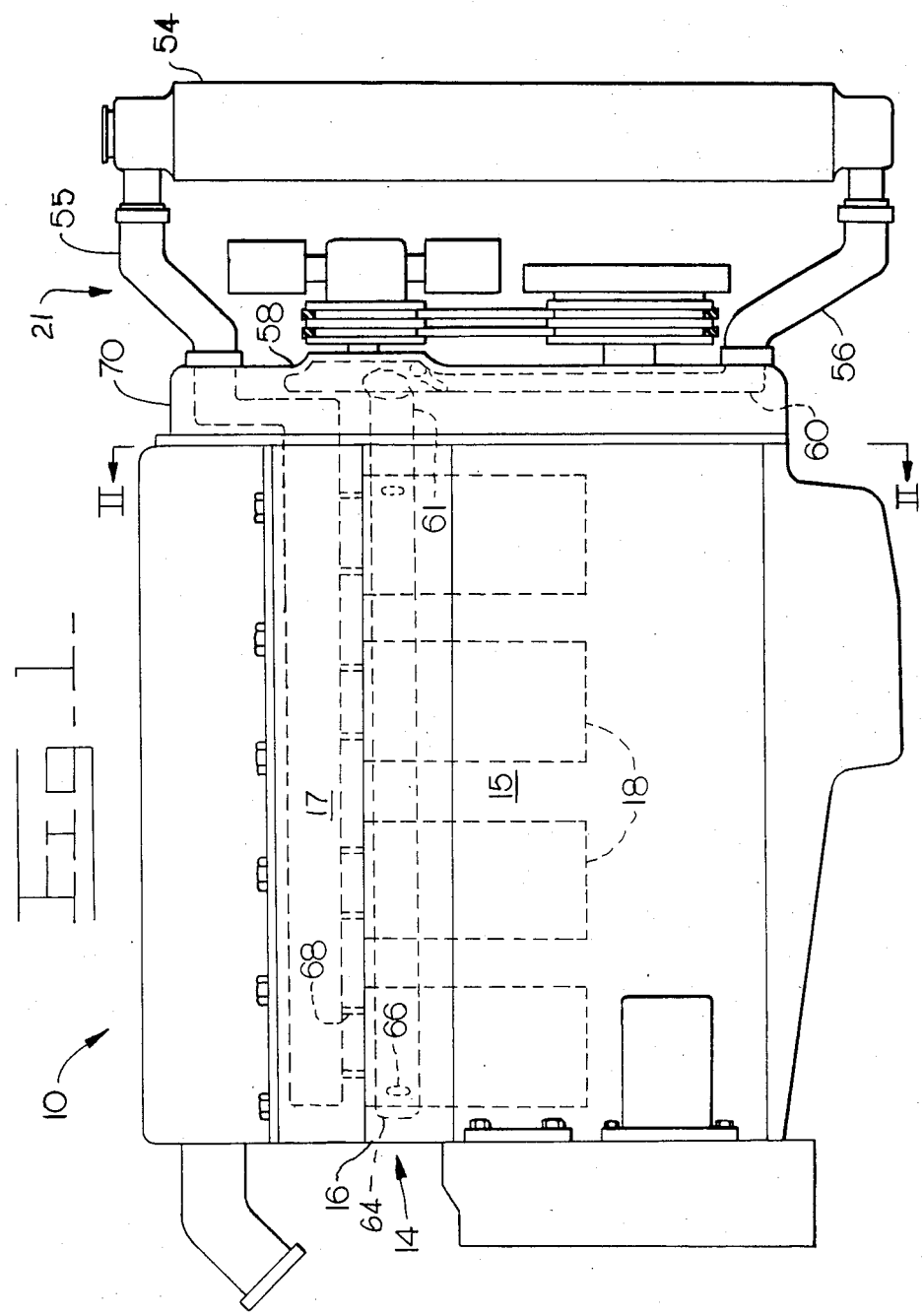
FIG. 1 is a side view of an engine having an embodiment of the present invention.

Referring now to the drawings, a multi-cylinder engine 10 includes a multipiece block 14 having a bottom block portion 15 and a top block portion 16. In addition, a cylinder head 17, a plurality of midsupported cylinder liners 18, a plurality of piston and ring assemblies 19, a camshaft 20 and a liquid cooling system 21 are included in the engine. Further included in the engine is means 22 for communicating liquid flow through the liquid cooling system 21, means 23 for attaching the cylinder head 17 to the bottom block portion 15 and means 24 for sealing liquid flow between the top block portion 16 and the cylinder head 17, the midsupported cylinder liner 18 and the top block portion 16, and the top block portion 16 and the bottom block portion 15. It should be noted that many of the components shown only in FIGS. 2 and 3 and hereinafter described in detail are duplicated at each cylinder of the engine.

The bottom block portion 15 has a plurality of bores therein one of which is shown at 28. The top block portion 16 has a plurality of bores therein one of which is shown at 34. The bores 34 in the top block portion 16 are substantially coaxial with the bores 28 in the bottom block portion 15. The top block portion 16 is positioned between the bottom block portion 15 and the cylinder head 17. The means 23 for attaching the cylinder head 17 to the bottom block portion 15 includes a plurality of fasteners 36 which extend through a plurality of holes 40 in the cylinder head 17 and a plurality of holes 42 in the top block portion 16 and threadedly engage a plurality of threaded bores 38 in the bottom block portion 16.

Each of the midsupported cylinder liner 18 has a lower portion 44 which extends into the bore 28 in the bottom block portion 15 and an upper portion 46 positioned in the bore 34 of the top block portion 16. The midsupported cylinder liner 18 is fixedly biased between the cylinder head 17 and the bottom block portion 15. The upper portion 46 cooperates with the bore 34 in the top block portion 16 forming an annular space 48 therebetween.

The midsupported cylinder liner 18 has an annular support surface 49 positioned between the upper portion 44 and the lower portion 46 and seats on the bottom block portion 15. An end 50 of the midsupported cylinder liner 18 contacts the cylinder head 17 and has an annular groove 51 formed therein. The sealing means 24 includes a compressible gasket 52 positioned between the top block portion 16 and the cylinder head 17. The compressible gasket 52 includes a compressible ring 53 positioned within the groove 51 between the midsupported cylinder liner 18 and the cylinder head 17.

The liquid cooling system 21 includes a heat exchanger 54, an upper flexible hose 55 and a lower flexible hose 56 connecting the heat exchanger to the engine 10, and a liquid cooling transfer pump 58. The liquid cooling transfer pump 58 is suitably driven by the engine 10 to establish a liquid flow through the cooling system 21. The heat exchanger 54 is connected to the lower hose 56 at one end and the other end of the hose 56 is connected to a passage 60 which communicates with the cooling transfer pump 58. A passage 61 connects the pump 58 with a passage 63 in an inlet cooling manifold 64 extending substantially the entire length of the top block portion 16. The inlet cooling manifold 64 in this embodiment is a separate component from the top block portion 16 and is attached to the top block portion 16 in liquid sealed relationship at one outer edge by a plurality of fasteners 65. Alternatively, the manifold 64 could be an integral part of the top block portion 16. Means 22 for communicating liquid flow through the liquid cooling system 21 includes a series of passages 66, a plurality of passages 68, a plurality of cooling passages 69 and an outlet manifold 70. The passages 66 are positioned between the inlet cooling manifold 64 and the annular spaces 48, the plurality of passages 68 are positioned between the annular spaces 48 and the plurality of cooling passages 69 located in the head. The cooling passage 69 is connected to the outlet manifold 70 which is connected to the upper hose 55.

A suitable number of passages 74 in the gasket 52 directs communication of liquid flow between the passages 68 and the plurality of liquid cooling passages 69. A plurality of first and second retaining groove 76,78 within the top block portion 16 and a plurality of first and second flexible seals 80,82 positioned in the respective grooves 76,78 are included in the means for sealing 24. The first flexible seals 80 sealably contacts the plurality of midsupported cylinder liner 18 while the second flexible seals 78 sealably contacts the bottom block portion 15.

A bore 98 in the top block portion 16 extends substantially the length of the block and is offset from and perpendicular to the bore 34. The camshaft 13 is rotatably positioned in the bore 98. The piston and ring assemblies 19 are slidably positioned within the midsupported cylinder liners 18 and are movable between a top position 100 and a bottom position 102 to define a stroke "S" of the piston and ring assembly 11. The top block portion 16 has a predetermined height "$H_1$" preferably selected from the range of about 30% to 100% of the stroke "S". The annular space 48 has a predetermined height "$H_2$" preferably selected from the range of about 30% to 65% of the stroke "S". The height "$H_2$" of the annular space 48 can be varied to provide a greater or lesser area of cooling.

INDUSTRIAL APPLICABILITY

The top block portion 16 is positioned over the bottom block portion 15 with the bores 34 in the top block portion 16 substantially coaxial with the bores 28 in the bottom block portion 15. The first and second flexible seals 80,82 are installed in the first and second grooves 76,78 and the midsupported cylinder liner 18 is inserted through the bores 28,34. The piston and ring assemblies 19 can be assembled separately or may be preassembled within the midsupported cylinder liner 18 as is conventional practice. The compressible gasket 52 is positioned on the top block portion 16 with the compressible ring 53 positioned in the annular groove 51. The cylinder head 17 is lowered onto the gasket 52 and the plurality of fasteners 36 inserted through the plurality of holes 40,42 in the cylinder head 17 and top block portion 16 and are threaded into the plurality of threaded bores 38 in the bottom block portion 15. Thus, assembly of the critical parts of the engine 10 is completed. Other conventional components are assembled in their normal way to complete the engine assembly.

The multipiece block 14 of the present invention results in an engine or compressor 10 having greater efficiency and lower manufacturing costs. The top block portion 16 is machined flat on the top and bottom in a simple milling operation. The separate inlet cooling manifold 64 is sealably attached to the top block portion 16 and simplifies the cleaning and coring operations reducing cost of the engine 10. All of the bores 34,42 are through bores which do not require a particular depth or bottoming operation as is required in many midsupported cylinder liner engines. The machining operations for the first and second flexible seal retaining grooves 76,78 are near the surface of the top block portion 16 and provides easy access reducing set up time and costs. The annular spaces 48 can be cast within the top block portion 16 or machined using a simple set up and requiring a minimum of time due to the easy access within the top block portion 16.

The midsupported liners 18 are free of sealing grooves along the upper and lower portions 44,46 reducing the stresses within the structure. The support surfaces 49 transfer the load from the cylinder head 17 through the midsupported liners 18 to the bottom block portion 15 and provides a simple compression loading within the midsupported liners 18. The midsupported cylinder liners eliminate the flange near the top of conventional cylinder liners enabling greater cooling of the piston and ring assemblies near the top of the stroke. This aspect of the invention allows one to move the top ring on the piston nearer to the top of the piston decreasing fuel consumption and reducing emissions.

Another advantage of using the top block portion 16 as disclosed in this invention is the variety of the engine sizes that can be manufactured on a common machining center and with a minimum of component changes. By varying the predetermined height "$H_1$" of the top block portion 16 and the stroke "S" the horsepower output of the engine can be varied while using the same bottom block portion 15 and cylinder head 17.

The application of the multipiece block 14 within an engine 10 is rewarding from the functional aspect as well as the manufacturing aspect.

The top block portion 15 is used to provide cooling for the midsupported cylinder liners 18 in the area in which combustion takes place. For example, predetermined height "$H_2$" of the annular spaces 48 are selected so that substantially only the length of the midsupported cylinder liners 18 in which combustion takes place are cooled thus controlling the combustion temperature within the combustion chamber. The top block portion 16 also enables the use of a different material for components of the multipiece block 14. The top block portion 16 in this embodiment is made of an aluminum alloy to utilize the heat rejection characteristics thereof and to permit the camshaft 13 to rotate within the bore 98 without requiring bearings.

The top block portion 16 of the multipiece engine block of the present invention reduces the manufacturing time and costs by providing a simple structure which is easy to cast and machine. The location of the top block portion 16 between the cylinder head 17 and the bottom block portion 15 reduces the complexity of cores for casting both the top and bottom block portion 16,15. The simplicity of design of the top block portion 16 reduces the set up and machining requirements over present single and multipiece block designs. The ability to vary the height "$H_1$" and "$H_2$" of the top block portion 16 and annular spaces 48 allows for the variation of engine size with a minimal change in components within an engine. The variation of height "$H_2$" enables greater control of the combustion temperatures within the combustion chamber resulting in higher efficiency and lower emissions from such an engine.

Other aspects, objects and advantages of this invention can be obtained from a study of the drawings, the disclosure and the appended claims.

I claim:

1. An engine including a multipiece block and a cylinder head, said multipiece block having a bottom block portion having a bore therein, comprising:
   a top block portion positioned between the bottom block portion and the cylinder head and having a bore substantially coaxial with the bore in the bottom block portion;
   means for attaching the cylinder head to the bottom block portion; and
   a removable midsupported cylinder liner having an end contacting the cylinder head, an upper portion positioned within the bore of the top block portion and a lower portion extending into the bore of the bottom block portion and an annular support surface positioned between the upper portion and the lower portion, said support surface seating on the bottom block portion and said end and said support surface of the midsupported cylinder liner being fixedly biased between the cylinder head and the bottom block portion.

2. The engine of claim 1 including a piston and ring assembly slidably positioned within the midsupported cylinder liner and movable between a top position and a bottom position to define a stroke "S" of the piston and ring assembly, said top block portion having a predetermined height "$H_1$" selected from the range of about 30% to 100% of the stroke "S".

3. The engine of claim 1 further including means for sealing between the top block portion and the cylinder head, the top block portion and the midsupported cylinder liner, and the top block portion and the bottom block portion.

4. The engine of claim 3 wherein said means for sealing includes a compressible gasket positioned between the top block portion and the cylinder head.

5. The engine of claim 1 wherein said bottom block portion includes a plurality of threaded bores therein, said cylinder head includes a plurality of holes therein, and said top block portion includes a plurality of holes therein, and said means for attaching includes a plurality of fasteners extending through the holes in both the cylinder head and the top block portion and threadedly engage the plurality of threaded bores.

6. An engine including a multipiece block and a cylinder head, said multipiece block having a bottom block portion having a bore therein, comprising:
   a top block portion positioned between the bottom block portion and the cylinder head and having a bore substantially coaxial with the bore in the bottom block portion;
   means for attaching the cylinder head to the bottom block portion;
   a removable midsupported cylinder liner having an upper portion positioned within the bore of the top block portion and a lower portion extending into the bore of the bottom block portion and annular support surface positioned between the upper portion and the lower portion, said support surface seating on the bottom block portion and said midsupported cylinder liner having an end contacting the cylinder head and an annular groove at said end and being fixedly biased between the cylinder head and the bottom block portion; and
   a gasket positioned between the top block portion and the cylinder head including a compressible ring positioned within the groove between the midsupported cylinder liner and the cylinder head.

7. The engine of claim 6 wherein said means for sealing further includes a first retaining groove within the top block portion and a first flexible seal positioned within said groove and sealingly contacting the midsupported cylinder liner.

8. The engine of claim 7 wherein said means for sealing further includes a second retaining groove within the top block portion and a second flexible seal positioned within the second groove and sealingly contacting the bottom block portion.

9. The engine of claim 6 including a camshaft wherein said top block portion has therein a bore extending substantially the length of the top block portion and offset from and perpendicular to the through bore in the top block portion, said camshaft being rotatably positioned in the bore.

10. The engine of claim 6 wherein the top block portion is an aluminum alloy.

11. An engine including a multipiece block having a bottom block portion having a bore therein, and a liquid cooling system having a liquid cooling transfer pump and a heat exchanger, comprising:
a cylinder head having a plurality of liquid cooling passages connected in a liquid flow relationship with the transfer pump and the heat exchanger;
means for attaching the cylinder head to the bottom block portion;
a top block portion positioned between the bottom block portion and the cylinder head and having a through bore substantially coaxial with the bore in the bottom block portion;
a removable midsupported cylinder liner having an upper portion positioned within the through bore of the top block portion, a lower portion extending into the bore of the bottom block portion, and an annular support surface positioned between the upper portion and the lower portion, said support surface seating on the bottom block portion, and said upper portion cooperating with the bore of the top block portion forming an annular space therebetween;
means for communicating the liquid flow between the annular space and a plurality of cooling passages in the cylinder head; and
means for sealing the liquid flow passing through the annular space.

12. The engine of claim 11 including a piston and ring assembly slidably positioned within the midsupported cylinder liner and movable between a top position and a bottom position to define a stroke "S" of the piston and ring assembly, said annular space having a predetermined height "$H_2$" selected from the range of about 30% to 65% of the stroke "S".

13. The engine of claim 11 wherein said means for sealing includes a compressible gasket positioned between the top block portion and the cylinder head.

14. The engine of claim 13 wherein the midsupported cylinder liner has an end contacting the cylinder head and an annular groove at said end, said gasket including a compressible ring positioned within the groove between the midsupported cylinder liner and the cylinder head.

15. The engine of claim 13 wherein said means for sealing fluid flow further includes a first retaining groove within the top block portion and a first flexible seal positioned within said groove and sealingly contacting the midsupported cylinder liner.

16. The engine of claim 15 wherein said means for sealing fluid flow further includes a second retaining groove within the top block portion and a second flexible seal positioned within the groove and sealingly contacting the bottom block portion.

17. The engine of claim 11 wherein said bottom block portion includes a plurality of threaded bores therein, said cylinder head includes a plurality of holes therein, and said top block portion includes a plurality of holes therein, and said means for attaching includes a plurality of fasteners extending through the holes in both the cylinder head and the top block portion and threadedly engaging the plurality of threaded bores.

18. The engine of claim 11 including a camshaft wherein said top block portion has therein a bore extending substantially the length of the top portion and offset from and perpendicular to the through bore in the top block portion, said camshaft being rotatably positioned in the bore.

19. The engine of claim 11 including a cooling manifold having a passage therein and being connected to the liquid cooling system, said cooling manifold being sealably attached to one outer edge of the top block portion and extends substantially the entire length of the top block portion, said top block portion having a passage connected to the annular space and the passage.

* * * * *